(12) United States Patent
Zimmerman et al.

(10) Patent No.: US 6,184,865 B1
(45) Date of Patent: *Feb. 6, 2001

(54) CAPACITIVE POINTING STICK APPARATUS FOR SYMBOL MANIPULATION IN A GRAPHICAL USER INTERFACE

(75) Inventors: Thomas G. Zimmerman, Cupertino; Barton Allen Smith, Campbell, both of CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/735,482

(22) Filed: Oct. 23, 1996

(51) Int. Cl.[7] ....................................................... G09G 5/08
(52) U.S. Cl. ............................................ 345/160; 345/161
(58) Field of Search ..................................... 345/156, 161, 345/157, 160, 159, 168, 184; 74/471; 341/20, 21, 22; 463/37, 38, 39

(56) References Cited

U.S. PATENT DOCUMENTS

| 3,270,260 | 8/1966 | Mehr . |
| 3,447,766 | 6/1969 | Palfreyman ............................ 244/83 |
| 4,103,252 | 7/1978 | Bobick .................................. 331/48 |

(List continued on next page.)

FOREIGN PATENT DOCUMENTS

| 2 234629 | 2/1991 | (GB) . |
| 50-15669 | 6/1975 | (JP) . |
| 59-155735 | 9/1984 | (JP) . |
| 62-153538 | 9/1987 | (JP) . |
| 02184912 | 7/1990 | (JP) . |
| 8-006711 | 1/1996 | (JP) . |
| 8-272524 | 10/1996 | (JP) . |
| WO 92/18927 | of 1992 | (WO) . |
| WO 92/09996 | 6/1992 | (WO) . |

OTHER PUBLICATIONS

Integrated Pointing Device Engineering Specification: "Pointing Stick Type", by T. Selker, J. Rutledge and B. Olyha, May 1994, pp. 1–46.*

IBM Technical Disclosure Bulletin, vol. 28, No. 5, Oct. 1985, pp. 1859–1860.

S. Chitale, C. Huang, & M. Stein, Electro–Sci. Lab., Inc. King of Prussia, PA, High Gauge Factor Thick Film Resistors for Strain Gauges, Reprinted from Hybrid Circuit Tech., May 1989.

E. Nassimbene, "Smart Key", *IBM Technical Disclosure Bulletin*, vol. 28, No. 5, Oct. 1985, pp. 1859–1860.

*Primary Examiner*—Chanh Nguyen
(74) *Attorney, Agent, or Firm*—James C. Pintner; Michael J. Buchenhorner; Fleit, Kain, Gibbons, Gutman & Bongini P.L.

(57) ABSTRACT

A structure is provided for a user-manipulable input device, such as an in-keyboard, joystick-type device, for allowing a user to provide input to a computer graphical user interface (GUI). The structure includes a user-manipulable, articulating member, and a plurality of stationary, electrically conductive sensors. The articulating member also has an electrically conductive member. The physical disposition of the articulating member and the sensors provides narrow gaps, across which are measurable capacitances. As the user manipulates the articulating member, the capacitances change in value. Circuitry produces signals related to the capacitances, and the signals are processed, according to a transfer function, to generate GU I input signals. The sensors are preferably sensing electrodes, incorporated into a circuit board. The articulating member is preferably a cone-shaped member, having a conductive surface which faces the sensors. The articulating member is mechanically coupled to the board holding the sensors by a flexing member that biases the articulating member to a quiescent position.

36 Claims, 9 Drawing Sheets

U.S. PATENT DOCUMENTS

| | | | |
|---|---|---|---|
| 4,264,903 | 4/1981 | Bigelow | 340/365 |
| 4,305,007 | 12/1981 | Hughes | 307/116 |
| 4,311,980 | 1/1982 | Prudenziati | 338/4 |
| 4,364,047 | 12/1982 | Archer | 340/870 |
| 4,493,219 | 1/1985 | Sharp et al. | |
| 4,536,746 | 8/1985 | Gobeli | 340/365 |
| 4,550,316 | 10/1985 | Whetstone et al. | 340/710 |
| 4,670,743 | 6/1987 | Zemke | 340/709 |
| 4,694,279 | 9/1987 | Meno | 340/347 |
| 4,719,538 | 1/1988 | Cox | |
| 4,755,634 | 7/1988 | Pepper, Jr. | 178/18 |
| 4,782,319 | 11/1988 | Dell'Acqua et al. | 338/4 |
| 4,811,491 | 3/1989 | Phillips et al. | 33/366 |
| 4,872,672 | 10/1989 | Hoye et al. | 273/1 E |
| 4,932,265 | 6/1990 | Skuratovsky et al. | 73/727 |
| 5,012,231 * | 4/1991 | Felsenstein | 345/157 |
| 5,043,710 | 8/1991 | Rydel | 340/712 |
| 5,107,710 | 4/1992 | Huck et al. | 73/708 |
| 5,140,313 | 8/1992 | Wen | 340/709 |
| 5,160,918 | 11/1992 | Saposnik et al. | 340/709 |
| 5,224,384 | 7/1993 | Kremidas et al. | 73/721 |
| 5,237,753 | 8/1993 | Carlson et al. | 33/366 |
| 5,241,308 | 8/1993 | Young | 341/34 |
| 5,319,980 | 6/1994 | Kremidas | 73/721 |
| 5,345,807 | 9/1994 | Butts et al. | 73/4 R |
| 5,349,746 | 9/1994 | Gruenwald et al. | 29/620 |
| 5,407,285 | 4/1995 | Franz | 400/490 |
| 5,421,694 | 6/1995 | Baker et al. | 414/694 |
| 5,479,191 | 12/1995 | Komatsu | |
| 5,687,080 * | 11/1997 | Hoyt et al. | 345/161 |
| 5,790,101 * | 8/1998 | Schoch et al. | 345/161 |
| 5,847,694 * | 12/1998 | Redford et al. | 345/161 |

\* cited by examiner ered as FIG. 1 of the present patent application. For simplicity,

CAPACITIVE POINTING STICK APPARATUS FOR SYMBOL MANIPULATION IN A GRAPHICAL USER INTERFACE

FIELD OF THE INVENTION

The invention generally relates to the field of computer graphical user interface systems. More particularly, the invention relates to user-manipulable apparatus for moving a symbol, such as a cursor, on a display, and for entering "point and click" type user commands.

The invention has particular applicability to computer graphical user interface (GUI) apparatus, and can be used in systems which conventionally employ devices such as IBM Corporation's TrackPoint III pointing devices, in keyboards of various IBM computer products. (IBM and TrackPoint III are registered trademarks of International Business Machines Corporation.)

BACKGROUND OF THE INVENTION

The growing interactiveness of home entertainment systems, particularly cable television, interactive television, and Internet set-top boxes, is placing greater demands on hand-operated controls.

Mice have been commonly used as user-manipulable GUI apparatus. Using a mouse, a user directs the movement of a cursor across a display screen by corresponding manual mouse movements.

Joystick-type devices have also been used. In particular, IBM Corporation's TrackPoint III pointing device (hereinafter "TrackPoint-type device" or "TrackPoint device") has been mounted in-keyboard in many laptop computers. A TrackPoint-type device includes a button-like structure resembling a pencil eraser and disposed between keys of a computer keyboard, has facilitated the use of graphical user interfaces (GUIs) in portable computers. The need for a mouse, and a flat working surface on which the user manipulates the mouse, is eliminated, because the user is able to manipulate the TrackPoint device entirely within the keyboard.

A conventional physical implementation of the Track-Point III pointing device is described in co-pending, co-assigned U.S. patent application Ser. No. 08/181,648, filed Jan. 4, 1994. That implementation includes strain gauge sensors, and a post serving as a lever arm. By manipulating the post, the user flexes the strain gauges. Small analog signals produced by the strain gauges are interpreted by on-board software, and the cursor is moved accordingly.

The strain gauges produce a ½% full-scale signal change, and must be individually trimmed during manufacture to match their outputs. The manufacturing and trimming of the strain gauges, combined with the small analog signal they produce, contribute to the cost of the sensor, and of the electronics required to make a TrackPoint III system. Moreover, the small full-scale magnitude of the signal change places a burden on the data acquisition system which processes the strain gauge signals into cursor movement signals.

Therefore, an important objective in the design and manufacture of TrackPoint type devices is the reduction of these cost-adding factors.

These issues have been confronted in the design and manufacture of other types of user-manipulable electronic components. For instance, a conventional structure is taught in Hughes, U.S. Pat. No. 4,305,007, "Electronic Two Directional Control Apparatus", issued Dec. 8, 1981. This patent describes a structure including four sensing electrodes, whose capacitances independently vary in response to the proximity of an external object.

A physical implementation of the Hughes structure is shown in FIG. 7 of the Hughes patent, which is reproduced as FIG. 1 of the present patent application. For simplicity, and to allow for a brief summary of the description of the Hughes structure, the reference numbers not directly pertinent to the summary have been deleted.

The Hughes structure includes sensing electrodes 5 that map out four quadrants. A controlling member 3 at the end of a displaceable member 2, supported from above by a ball joint 1, moves in relation to the sensing electrodes 5. These elements are contained within a three dimensional grounded shield box 4.

Note, however, that, in addition to being impractical for implementation in a keyboard or in a portable computer, the Hughes structure requires considerable cost for parts and assembly. Also, the manufacturing process must include manual trimming of the electronic circuit to match the outputs of the four quadrants. Therefore, the Hughes apparatus does not provide the desired low cost.

SUMMARY OF THE INVENTION

Accordingly, it is an object of the invention to provide cost reductions in the manufacture of TrackPoint-type user-manipulable pointing devices which had not been realized in conventional structures.

To achieve this and other objects, there is provided in accordance with the invention an apparatus for sensing manipulation by a user and for producing signals related to the manipulation. The signals produced by such an apparatus may then be used as part of a user interface system. For instance, the signals might be used in a personal computer having a display screen, for causing movement of a displayed symbol, such as a cursor.

The apparatus essentially has two components. The first component includes an articulating member. Means are provided for causing the articulating member to articulate responsive to user manipulation thereof, and thereafter, to return to a quiescent position.

The second component includes a sensor array, made up of a plurality of sensing members disposed about the articulating member. Means are provided for detecting respective signals from the sensing members, the respective signals varying in value depending on articulation of the articulating member.

In accordance with the invention, these components are made up of inexpensive electrical components and simple mechanical components, to produce a low cost pointing device whose physical size and dimensions are suited for use in applications such as in-keyboard TrackPoint-type devices.

The sensing members preferably include flat, electrically conductive members on a planar substrate, such as etched conductive regions on a printed circuit board, and the articulating member includes an electrically conductive member whose varying proximity to the sensing members, due to the manipulation by the user, produces a correspondingly varying capacitance value. The magnitude of the capacitance is determined by a data acquisition system, preferably including RC oscillators and a microcontroller. In accordance with a suitable transfer function, the capacitance value is used to produce the cursor movement signals.

A device according to the invention may advantageously be employed as a pointing device for hand-held remote control applications, as well as for keyboards. Cost is a driving factor in the success of any device targeted to the consumer electronics market. The capacitive sensor and data acquisition system according to the invention (oscillator and microcontroller) provide advantageously low manufacturing costs.

The low-cost capacitive device according to the invention is also inherently less expensive than a mouse. Both pointing technologies require a microcontroller. In addition, a mouse requires two optical interrupters, two mechanical disks, a rotating ball, and a three dimensional structure to align these items. A preferred implementation of the capacitive sensor-based device according to the invention includes a conductive disk attached to the circuit board, and an inexpensive integrated circuit (Schmitt Trigger NAND). The invention uses fewer components, and is easier to manufacture and assemble. The absence of moving parts exposed to the environment means the invention has advantageously low maintenance, and a low failure rate.

DESCRIPTION OF THE PREFERRED EMBODIMENT

The description which follows will generally presume that an apparatus according to the invention will be used in connection with a computer's user interface. However, it will be understood that televisions, specialized World Wide Web browsers for use with televisions or other home electronics, and other such electronic devices, may also make advantageous use of the invention.

First Embodiment
Basic Sensing Device

Figure 1:
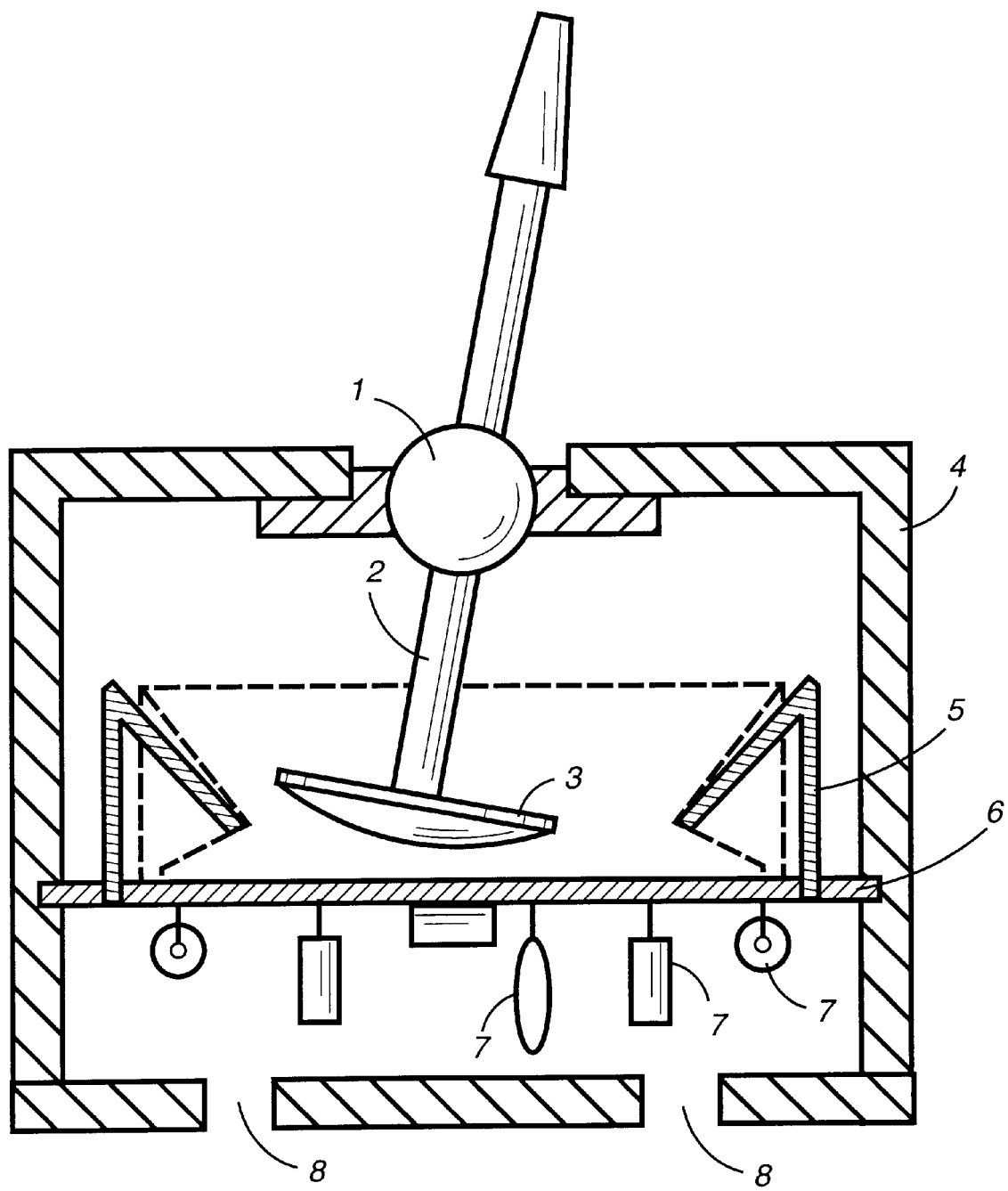
FIG. 1 is a cross-sectional diagram of a prior art structure.
Figure 2:
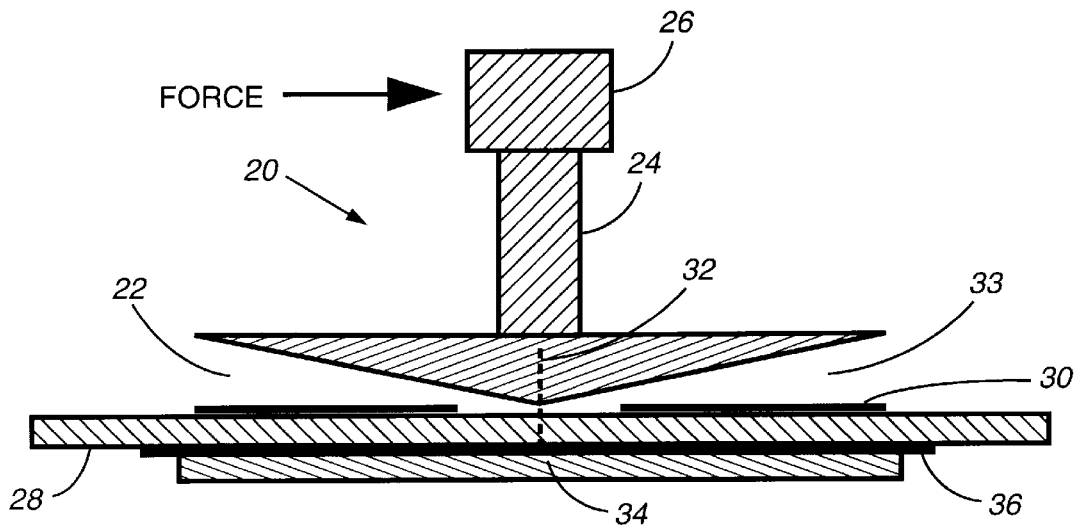
FIG. 2 is a side cross-section view of a first preferred embodiment of the invention.
Figure 3:
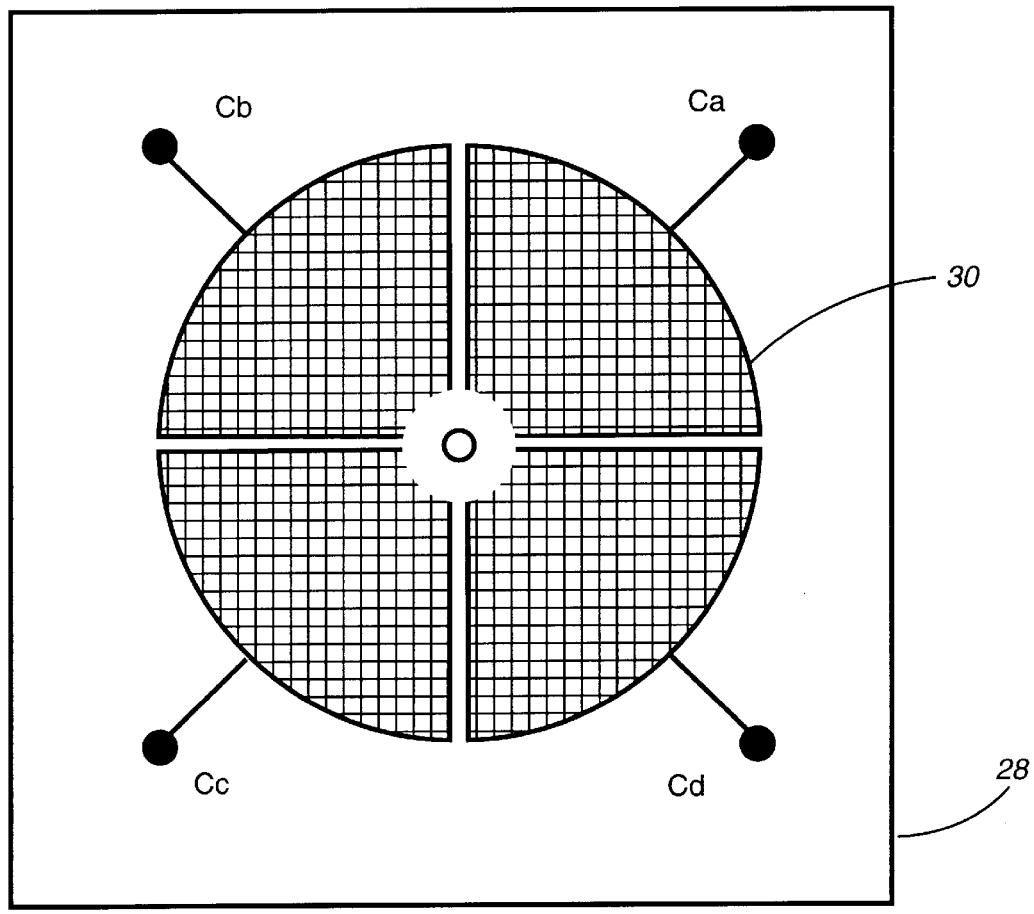
FIG. 3 is a top view of a portion of the embodiment of FIG. 2, showing the geometry of a set of sensing electrodes.
Figure 4:
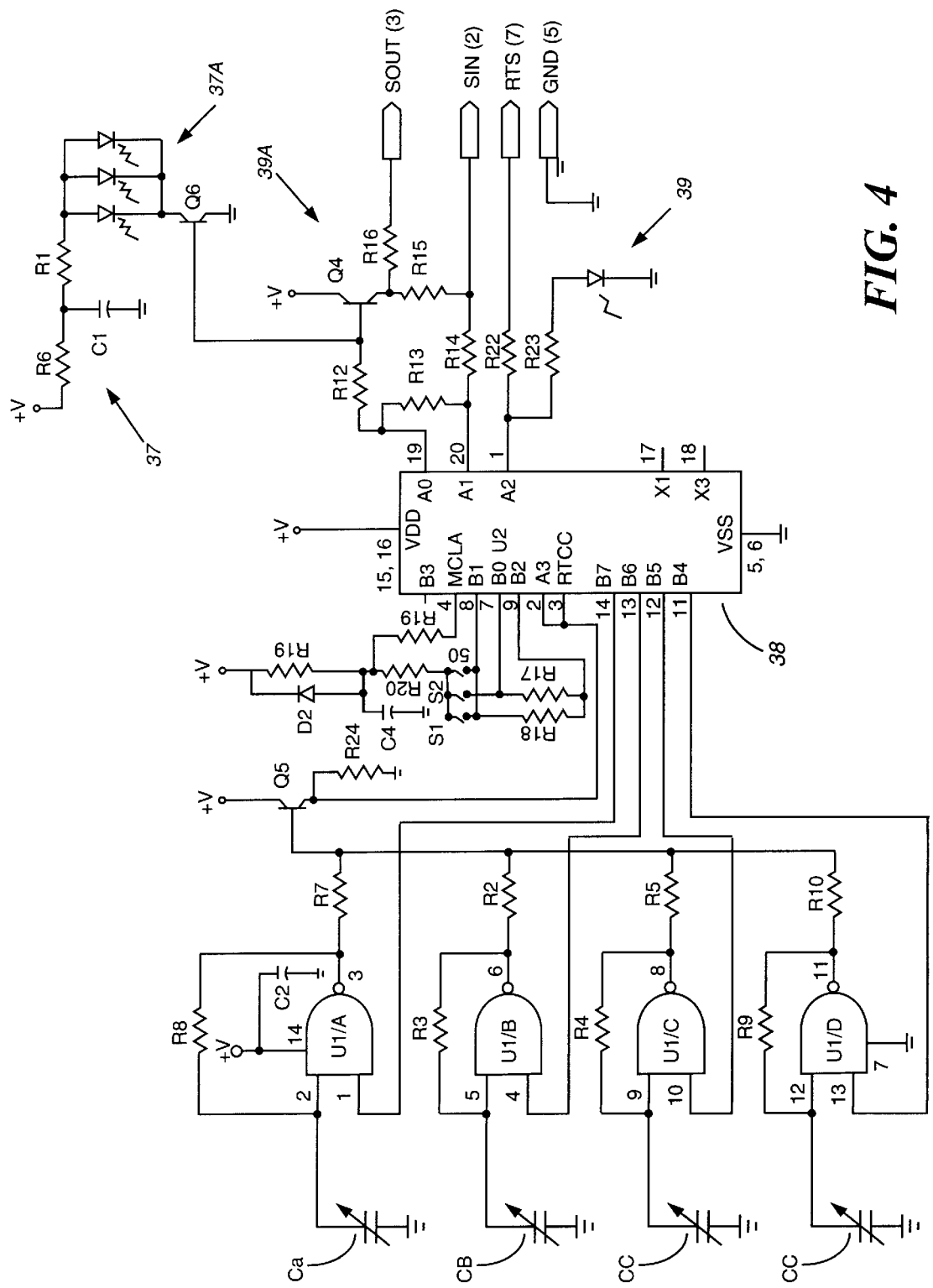
FIG. 4 is an electrical schematic diagram of circuitry for the embodiment of FIG. 2.

A preferred embodiment of the invention is shown in FIGS. 2, 3, and 4.

FIG. 2 is a cross-sectional side view of a preferred embodiment of the invention. An articulating member 20 includes a conductive cone 22 coupled to a shaft 24 with a textured cap 26. An example of the cap may be found in co-pending, co-assigned U.S. patent application Ser. No. 08/315,651, filed Sep. 30, 1994, "Grip Cap for Computer Control Stick.". The articulating member 20 produces a user-manipulable pointing stick device, having a look and feel similar to that of a conventional TrackPoint III device.

In an alternative embodiment, however, the shaft 24 and textured cap 26 can be replaced by a flat disk, which is pressed by the user.

The conductive cone 22 is preferably conical in shape, but conductive members of other shapes which would suggest themselves to persons skilled in the art for carrying out the invention may also be used. Also, a non-conductive member having a conductive layer, or member, on its surface, may also be used.

Underneath the conductive cone 22 is a circuit board 28, bearing a plurality of sensors, shown as sensing electrodes 30. The number of sensing electrodes 30 is preferably four, for detection of bidirectional movement in two dimensions. However, other suitable numbers and arrangements of sensing electrodes 30 will be understood by persons skilled in the art as being suitable for other applications of the invention.

FIG. 3 provides a top view of the board 28, showing in detail a preferred layout of the sensing electrodes 30. The sensing electrodes 30 are arranged as four quadrants of a circle. The sensing electrodes 30 are preferably etched copper clad, and electrically isolated from the conductive cone by a thin insulating layer, such as a solder mask or non-conductive tape (not shown).

Referring back to FIG. 2, the articulating member 20 is mechanically coupled to the board 28 by means for biasing the articulating member 20 to a quiescent position, from which the articulating member 20 is movable by user manipulation. Gaps 33 appear between the conductive cone 22 and the electrodes 30. The conical shape of the conductive cone 22 facilitates the formation of the gaps 33. From the discussion which follows, it will be seen that other shapes, so long as the shapes facilitate the formation of gaps, may equivalently be used.

In a preferred embodiment, the means for biasing includes a flexing member, for biasing the conductive cone 22 to a quiescent position, and for urging the conductive cone 22 back to the quiescent position if it has been moved, by externally applied force, from the quiescent position. The flexing member may be a tensile member such as a wire 32, which is coupled to the articulating member 20, and which runs down to the board 28, to which the wire 32 is secured.

Because of the conical shape of the conductive cone 22, the apex of the cone 22 forms a point of contact between the articulating member 20 and the board 28. The wire 32 runs axially through the conductive cone 22, emerges from the conductive cone 22 at its apex, and runs directly through the board 28. In the illustrated embodiment, the wire 32 is secured, by an electrically grounded securing rivet 34, to a conductive ground pad 36 on the bottom of the board 28.

The apex provides a pivoting point for the conductive cone 22. Tension on the wire 32 provides spring action to maintain the articulating member 20 in an upright (i.e., quiescent) position when no force is exerted on the articulating member 20, and to return the articulating member 20 to the quiescent position after force, previously applied, is released.

When a force, normal to the shaft 24 (i.e., horizontal as shown in FIG. 2), is applied, the wire 32 flexes, bringing a portion of the conductive cone 22 closer to one or more of the sensing electrodes 30, and another portion (on the opposite side) further away from the opposing one or more sensing electrodes 30. The gaps 33 change dimensions, accordingly.

The conductive cone 22, the respective sensing electrodes 30, and the gaps therebetween create four variable capacitors. The values of the variable capacitors depend on the distance between the conductive cone 22 and the respective sensing electrodes 30, i.e., on the dimensions of the gaps 33. For instance, as the distance between the conductive cone 22 and one of the sensing electrodes 30 decreases (that is, the width of the gap 33 decreases), the capacitance between the conductive cone 22 and that one of the sensing electrodes 30 increases.

The arrangement of the four sensing electrodes 30, as per the illustrated preferred embodiment, is referred to as a quadrature detection arrangement. Quadrature detection allows two degrees of freedom (i.e., the x and y components of applied force) to be measured.

The wire 32, which is grounded to the ground pad 36, preferably also grounds the conductive cone 22. The conductive ground pad 36 and the grounded conductive cone 22 shield the sensing electrodes 30 from electrical noise and stray capacitance that might otherwise effect sensor readings, such as fields introduced by the human hand or other electronic circuits nearby. The conductive ground pad 36 and the grounded conductive cone 22 also protect the sensing electrodes 30 and their associated electronics from high voltage electric discharge.

In a preferred implementation of the sensor of FIGS. 2 and 3, the outer diameter of the sensing electrodes 30 and the base (top) of the conductive cone 22 are both 1 cm, and the wire 32 is 0.61 mm diameter. The implementations made by the inventor have used steel piano wire, and other types of music wire, such as strings for stringed instruments, may also be used.

Changes in capacitance are preferably measured by incorporating each of the sensing electrodes 30 into a respective RC oscillator. The resultant RC time constant, and therefore the frequency of oscillation, is a function of the capacitance between the conductive cone 22 and the respective sensing electrodes 30.

Referring now to FIG. 4, there is presented an electrical schematic of a preferred embodiment of circuitry for utilizing the capacitances provided by the apparatus of the invention.

The four sensing electrodes 30 of FIGS. 2 and 3 are represented in FIG. 4 as variable capacitors Ca, Cb, Cc, and Cd. The ground of each of the sensing electrodes 30 is preferably that of the conductive cone 22.

The variable capacitance values are used in combination with feedback resistors R8, R3, R4, and R9, and with NAND gates U1/A, U1/B, U1/C, and U1/D (preferably provided in a 74HC132 Schmitt-triggered input integrated circuit; pinouts shown), to create four oscillators and a sensor selector.

Each NAND gate has two inputs, one serving as an oscillator input (e.g., the pin 2 input of the U1/A gate of the 74HC132 device, which is shown as coupled to the sensing electrode 30 represented as the capacitor Ca), and the other (e.g., the pin 1 input of the U1/A gate) serving as a selection control line. When the selection control line of one of the four NAND gates is high (the other three control lines being low), the selected oscillator will oscillate.

The outputs of the four NAND gate oscillators (e.g., pins 3, 6, 8, and 11 of the illustrated 74HC132 device) are ORed together by a transistor Q5 (e.g., a 2N3906 PNP bipolar transistor). Suitable coupling, such as resistors R7, R2, R5, and R10, are provided. The output of the transistor Q5 (the collector of the transistor Q5) thus produces a signal which oscillates at a frequency related to the capacitance of the selected sensing electrode 30.

The frequency of oscillation of the ORed result is counted by a microcontroller 38, preferably a PIC16C58A integrated circuit (pinouts shown). The microcontroller 38 runs calibration code that normalizes the gain of each of the four illustrated sensor circuits, producing a normalized force signal, compensating for component, mechanical, and manufacturing tolerances.

Since the sensor is to emulate a conventional mouse pointing device which has velocity as an output, the microcontroller 38 performs a non-linear transformation on the normalized force signals to produce a velocity signal. The microcontroller 38 formats the velocity signal into conventional mouse protocol such as "Microsoft Mouse", and sends the velocity signal out through an output such as a serial port (RS-232 or PS/2) 39, or an infrared (IR) port 37.

In the embodiment of FIG. 4, two types of communication interfaces, infrared (IR), generally shown as 37, and wired, generally shown as 39, are provided. Either or both may be used in implementations in accordance with the invention.

In the IR interface 37, a high current transistor Q6 (e.g., an FZT869) switches high-brightness infrared light emitting diodes 37A (e.g., HSDL4220) for infrared communication. In the wired interface 39, a low current switching transistor Q4 (e.g., 2N3906) implements a serial RS-232 communication interface 39A.

In a preferred embodiment, the microcontroller 38 selects one of the NAND gate oscillators, and counts the number of oscillations for a fixed period of time. The final count is proportional to the sensor frequency 80, and is used to determine the applied force. This will be explained in greater detail in the section "DYNAMIC CALIBRATION", appearing below.

The feedback resistors R8, R3, R4, and R9 are chosen for the maximum oscillation frequency countable by the microcontroller 38, typically less than 1 MHZ. Each sensor channel is integrated (oscillation counted) for 2.5 msec, resulting in a 100 Hz update rate of force direction and magnitude applied to the conductive cone 22. The implementation provides a 10 bit resolution sensor measurement signal with a full-scale change in excess of 25%.

The current cost for large quantities (e.g., more than 100,000) of the Schmitt-trigger NAND circuits, and of the microcontroller 38, is approximately $0.20 and $1.00 per piece, respectively, making it possible to construct a capacitive sensor with acquisition and processing hardware for less than $3. These figures compare quite favorably with previous implementations of pointing devices, such as that of co-pending patent application Ser. No. 08/181,648. Note also that the other conventional devices, such as that shown in the Hughes patent, would evidently be much more costly to produce, even if they were suitable for in-keyboard applications.

Compared with Hughes, devices according to the invention are easier and less expensive to fabricate, using a conventional printed circuit board process, and are more compact because they have a lower profile.

Attaching the articulating member 20 to the two dimensional surface (such as the circuit board 28) which includes the sensing electrodes 30, as shown in FIGS. 2 and 3, decreases material and assembly cost, and makes for a more compact device.

Note, also, that the prior art Hughes patent teaches a device whose quiescent position places no conductor in the vicinity of the sensing electrodes. In that quiescent position, each of the capacitances of each sensing electrode is negligible, due to the relatively great distance. By contrast, in the present invention, the conductive cone 22 is in the vicinity of the sensing electrodes 30. The capacitances of the sensing electrodes 30, in the quiescent position, have finite, measurable, and useable values.

Moreover, the quiescent capacitance values need not necessarily be equal or even substantially equal. As will be discussed below, transfer functions, including scaling, are employed to utilize the raw information obtained from the capacitance values.

Because the invention employs a plurality of sensing electrodes, such as the exemplary four two-dimensional sensing electrodes 30, are disposed on a substrate in continuous close proximity to the articulating member 20, necessitates calibration unforeseen by Hughes. The present invention provides calibration to create an accurate and sensitive force sensor from low-cost, low tolerance parts, using low-cost construction techniques. Measuring small forces accurately near the quiescent position is vital for pixel manipulation in computer applications. Thus, even taking into account the manufacturing time and costs associated with the calibration, the resultant sensor according to the invention compares favorably with conventional devices.

The capacitances are calibrated, preferably by using an adaptive algorithm in which the maximum, minimum, and quiescent channel readings are stored, and in which a gain factor is calculated from these values. Independent RC oscillators are used, each sensing electrode 30 contributing substantially to the capacitance of one RC oscillator. Therefore, advantageously accurate values are obtained.

Second Embodiment
Sensing Device with Select Switch

In accordance with a second embodiment of the invention, a switch is provided, along with the sensing apparatus described above. The switch is preferably monostable, having a stable position when the articulating member 20 is not being manipulated, and having a second position, which the switch enters when the articulating member 20 is manipulated in a suitable fashion, and remaining in the second position only until the user ceases manipulating the articulating member 20.

The switch is provided for either (or both) of two purposes. The first purpose is related to the use of mechanical switches, on conventional mice, to select objects (one click), to launch programs (two clicks), and to select and drag an icon or other object (press to select object, hold while moving object). A switch as provided in the embodiment to be described provides for that same functionality.

The second purpose of the switch of the present embodiment has to do with power savings. In battery powered systems, such as portable computers and audio/visual equipment remote controls, the sensor electronics are preferably powered only when the sensor is actually being used by an operator. Switching is provided, in accordance with the invention, to achieve this power savings.

Power savings is implemented as follows: A timer is used to shut off the sensor electronics after a period of inactivity. In an embodiment similar to that of FIG. 4, the microcontroller 38 is preferably programmed to perform the timing and switching function.

To re-activate the sensor electronics, the switch is used to indicate user activity. In a preferred implementation, a polling scheme is used. In such a scheme, the sensor electronics are periodically energized, for example every second, to check for activity. When the polling indicates that the sensor has been touched, power is restored. Touching is preferably detected by means of a threshold pressure, such as 10 grams. Closing the switch sends a "wake up" signal to the microcontroller 38.

In a preferred way of enabling such a switching arrangement to wake up the microcontroller 38, the user applies a vertical (z axis) force to the pointing stick, achieved through the embodiments described below. (Note, by the way, that similar user manipulation of the device according to the invention may also select and drag an object.)

Figure 5:
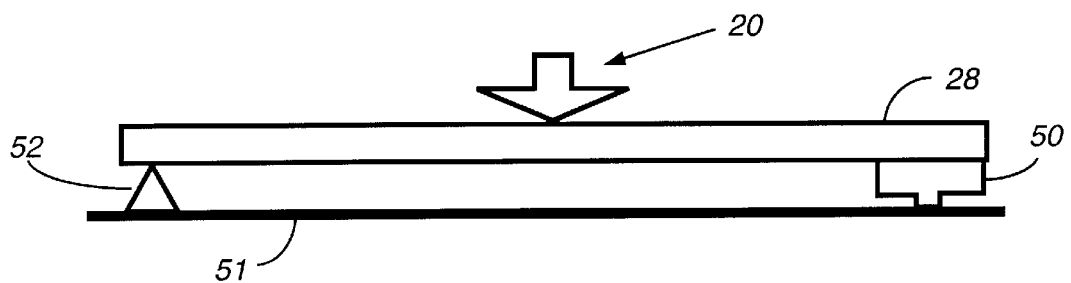
FIGS. 5 and 6 are cross-sectional diagrams showing views of various alternative embodiments of a physical structure according to the invention, further including switching for providing tactile feedback.

Referring to FIG. 5, a mechanical switch 50 is placed underneath the sensor, offset from the articulating member 20, using the circuit board 28 as a lever arm, and having a fulcrum 52 disposed across from the switch 50. The location of the fulcrum 52, the member 20, and the switch 50 may be positioned, relative to each other, in any suitable arrangement to obtain the desired activation force and displacement.

The mechanical switch 50 is preferably a metal dome type, to give tactile feedback (an impulse "click") when engaged, and hysteresis when disengaged. The switch activation force should preferably be greater than the force used to move a cursor, to prevent accidental switch engagement when translation of the cursor was intended. A typical switch activation force is 350–400 grams with 50 grams of hysteresis.

Figure 6:
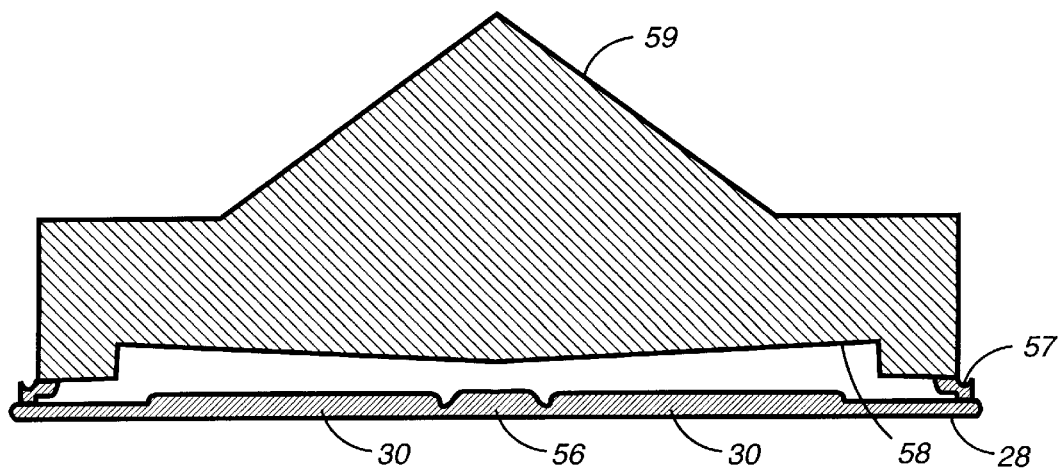

Referring to FIG. 6, an articulating member 59 is used in place of the conductive cone 22. The upper surface of the member 59 has a shape and texture suitable for good contact with a user's fingertip, and is not essential to the invention. In a preferred embodiment, the member 59 is made of molded rubber. However, other materials, having properties suitable for the purpose to be described herein, may be used.

The lower surface of the member 59, which faces the sensors 30, has disposed thereon a conductive layer, such as a layer of conductive rubber 58. The conductive rubber layer 58 preferably has a shallow conical shape, to provide a variable gap between the conductive rubber 58 and the sensing electrodes 30. As shown in FIG. 6, the apex of the cone-shaped conductive rubber 58 is slightly closer to the board 28 than the perimeter of the conductive rubber 58 is. This arrangement lends itself well to calibration (described below).

The member 59 preferably has low resilience. Manipulation by the user's fingertip causes the member 59, as a substantially rigid body, to be displaced. Likewise, the conductive layer 58 is displaced, so as to cause changes in capacitance, similarly to the changes in capacitance described above for the previous embodiment of the invention.

A force applied to the top of the articulating member 59 in the x-y plane (a lateral force, that is, having a component parallel to the circuit board 28) causes a section of the conductive rubber 58 to move closer to the sensing electrodes 30. This closer proximity causes a differential change in capacitance among the four sensing electrodes 30.

A force applied to the apex of the articulating member 59 in the z-axis (straight down towards the circuit board 28) causes the conductive rubber 58 to move closer to all four sensing electrodes 30. This motion causes a common mode change in capacitance among the four sensing electrodes 30.

The microcontroller 38 of FIG. 4 processes the four sensing electrode signals so as to identify this z-axis force. A preferred method of doing so is to sum the calibrated outputs of each sensor channel. This calculation will be discussed in more detail in the section describing calibration (below).

A switching state can be deduced from the identified z-axis force by several techniques. A simple method is to set an absolute threshold that must be exceeded to be interpreted as a change in switch state. Hysteresis can be added to prevent switch "chatter" when the z-axis force, applied to the apex of the articulating member 59, centers around the switching threshold.

Another method is to compare a derivative of the z-axis force with a threshold value. This method can employ the first derivative representing velocity, or the second derivative representing acceleration.

Another aspect of the preferred structure of FIG. 6 provides tactile feedback. A thin wall 57 is shown, running around a perimeter of the articulating member 59. The thin wall 57 is shown, in the cross-section of FIG. 6, at either outer end of the articulating member 59. The shape of the wall 57 preferably follows the shape of the perimeter of the articulating member 59. Where the member 59 is cone-shaped, the wall 57 is annular in shape, similar to that commonly provided in rubber dome switches.

As per similar structures in dome switches, this wall 57 provides a "breakaway force. That is, an abrupt tactile sensation, responsive to fingertip force of a suitable magnitude, is caused by the collapse of the thin wall 57 under the pressure from the users fingertip.

The breakaway force provides physical tactile feedback to the user when the articulating member 59 is pressed in the z-axis with sufficient activation force (e.g. 30 grams). For the purpose of operating the GUI, the circuitry of FIG. 4 detects the activation force as a dramatic change in the sum of all sensor channels by the microcontroller 38.

In another preferred embodiment, a switch sensing electrode 56 is provided on the circuit board. (FIG. 6 shows the electrode 56 centered below the articulating member 59, but other suitable locations may also be used.)

The collapse of the thin wall 57 allows the conductive rubber 58 to make physical resistive contact with the switch sensing electrode 56, closing an electrical circuit and generating an electrical signal. The electric signal can be used to wake up the microcontroller 38 from its sleeping mode, or to function as a mouse switch (e.g. to select an object) when the microcontroller 38 is operating.

The embodiment illustrated in FIG. 6 may be built using otherwise conventional rubber dome switch materials and otherwise conventional manufacturing techniques, minimizing cost and complexity. The articulating member 59 and the conductive rubber 58 can be part of a one piece multiple switch assembly, such as those used on television remote controls. Some alternative methods of manufacture include coating the side of the articulating member 59 facing the circuit board 28 with a conductive material, or impregnating the entire articulating member 59 with a conductive filler, such as carbon.

Third Embodiment

Resilient Conductive Material

Figure 7A:
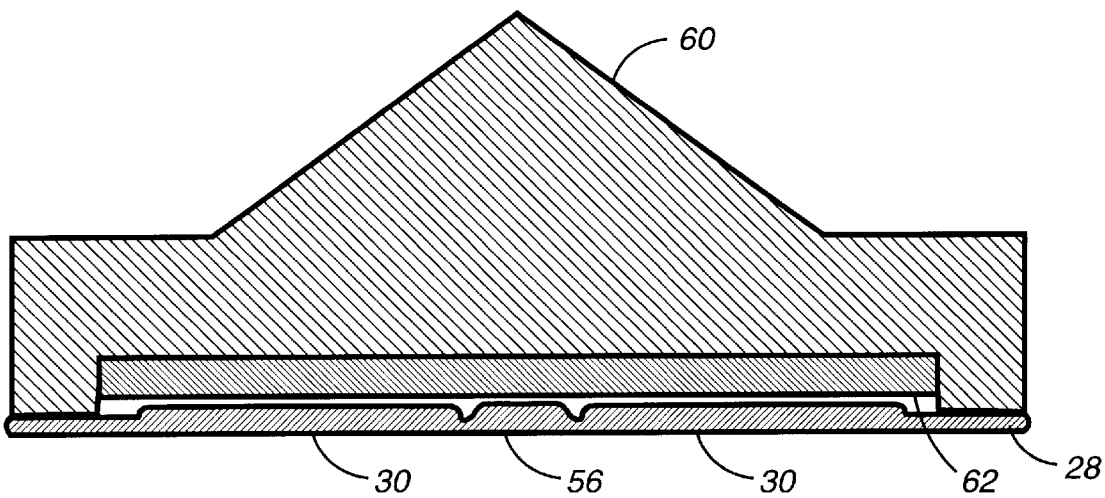
FIG. 7A is a cross-sectional diagram showing another preferred embodiment of the invention.
Figure 7B:
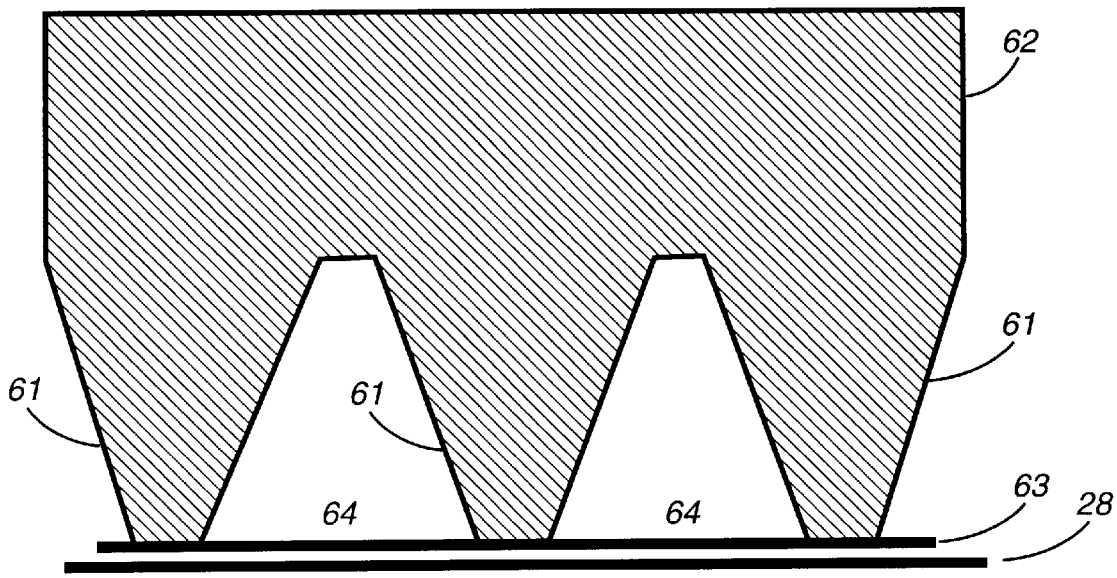
FIGS. 7B and 7C are detailed views of a portion of the embodiment of FIG. 7A.
Figure 7C:
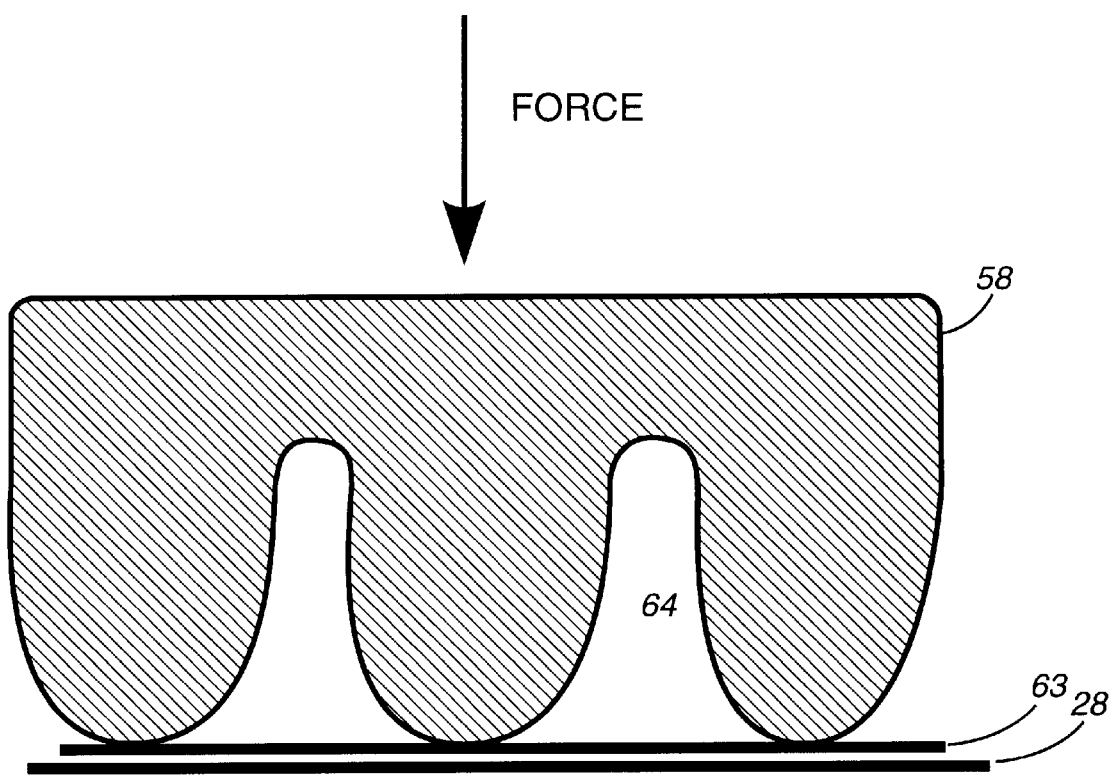

Another preferred embodiment of the apparatus of the invention is shown in FIGS. 7A, 7B, and 7C, a general cross-sectional view and two detailed cross-sectional views, respectively.

Referring to FIG. 7A, an articulating member 60 is disposed on the circuit board 28, the latter having the sensing electrodes 30 and the switch sensing electrode 56 disposed thereon, as per previously discussed embodiments. The conductive rubber layer 58 of FIG. 6 is replaced by a textured conductive rubber 62, attached as before to the inside (lower) surface of the articulating member 60.

A thin insulating layer 63 (e.g., solder mask or non-conducting tape) is preferably provided, to prevent resistive contact between the conductive rubber 62 and the sensing electrodes 30.

FIGS. 7B and 7C are views of surface detail of the textured conductive rubber 62. As shown in FIG. 7B, the surface includes alternating projections 61, preferably in the form of teeth, and voids 64.

As shown in the detail of FIG. 7C, when force is applied to the articulating member 60, the conductive rubber 62 compresses against the circuit board 28. This causes the teeth 61, made of resilient, conductive rubber material, to deform and expand sideways, filling the voids 64.

The deformation of the conductive material brings more of the conductive material closer to the sensing electrodes 30. This added proximity decreases the capacitance between the conductive rubber 62 and the sensing electrodes 30.

Fourth Embodiment

Floating Conductive Cone

Figure 8A:
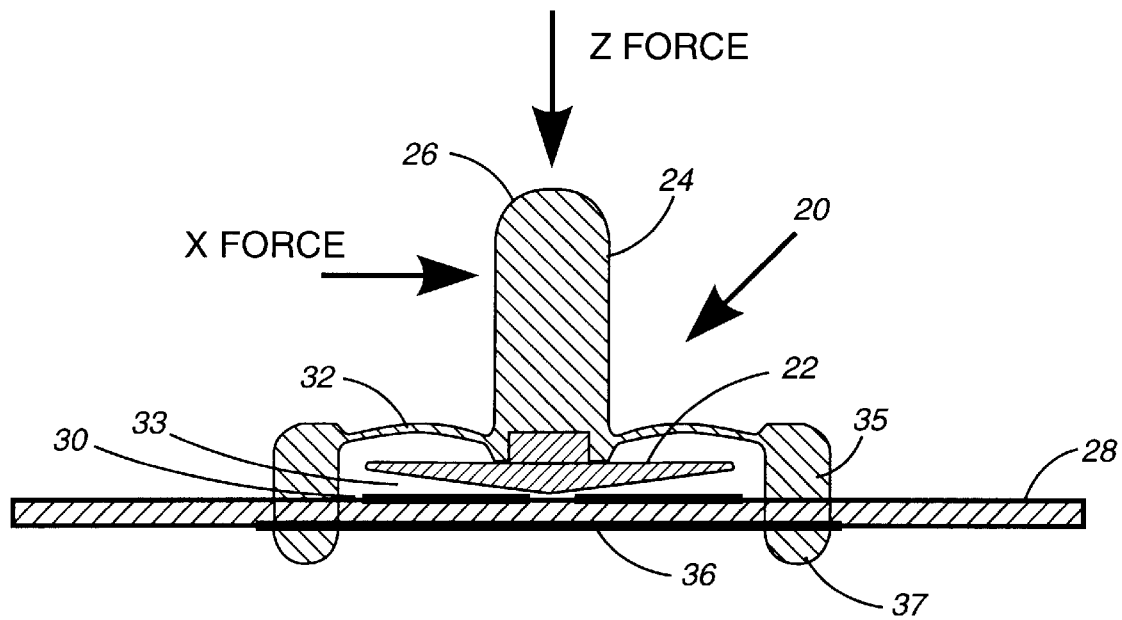
FIG. 8A is a side cross-sectional view of yet another preferred embodiment of the invention.
Figure 8B:
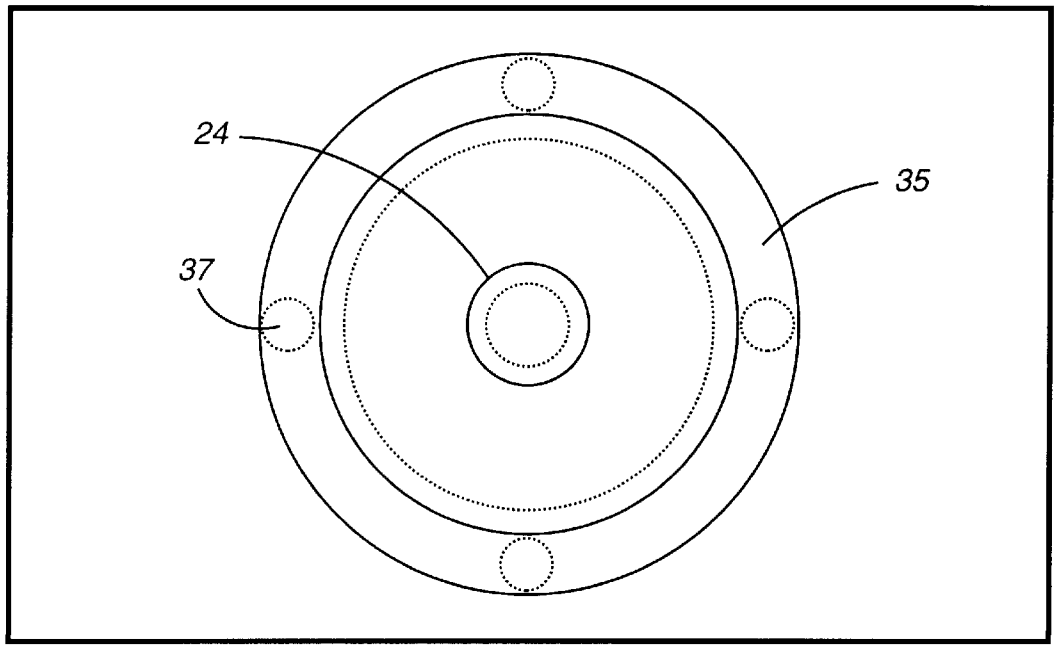
FIG. 8B is a top cross-sectional view of a portion of the embodiment of FIG. 8A.

A fourth embodiment of the invention is shown in a cross-sectional view in FIGS. 8A and 8B. As is the case with previously described embodiments of the invention, the conductive cone 22 is suspended above the sensing electrodes 30 by the articulating member 20.

In this embodiment, however, the articulating member 20 includes a shaft 24, preferably oriented along a vertical axis, and having a top 26 for user fingertip manipulation. Also, an immobile support member 35 is coupled to the shaft 24 by a flexible member 132. Preferably, the flexible member 132 has a convex shape similar to that of a collapsible dome, so that user manipulation can cause a collapse of the flexible member 132, the collapse providing tactile feedback. The support member 35 is preferably annular, as shown in FIG. 8B, and preferably has a plurality of anchoring posts 37, which are inserted into apertures in the board 28, to anchor the support member 35 in place.

The cone 22 is coupled to the bottom of the shaft 24, to move therewith, responsive to user fingertip manipulation. As before, narrow gaps 33 exist between the surface of the cone 22 and the sensors 30.

Forces normal (x and y) and parallel (z) to the shaft 24 may be measured by the illustrated apparatus. The gaps 33 between the entire conductive cone 22 and the electrodes 30 (typically 0.01 inch at zero force), in combination with the articulating member 20, allow three dimensional movement of the conductive cone 22 by forces applied to the shaft 24. The flexible member 132 provides the restoring force, and is preferably shaped as an arch, to distribute the stress and keep the stress well within the elastic limit of the material. The thickness of the flexible member 132, the length of the shaft 24, and the modulus of the material contribute to the sensitivity and maximum force that can be measured.

A typical articulating member 20, constructed of nylon with a 0.4 inch long shaft and a 0.01 inch wall flexible member 132, can operate over one million cycles when flexed with a 350 gram load.

The present embodiment of the invention offers advantageously simple construction and installation. The anchoring posts 37 are preferably made of a material, such as nylon, which can be ultrasonically welded to the circuit board 28. The conductive cone 22 and articulating member 20 are preferably injection molded parts, press-fit together. The cap 26 preferably has texturing, such as protrusions molded into the part (preferably less than 0.005 inch in width and 0.01 in length), to catch the skin of the finger, providing a "grippy" high friction top.

This embodiment facilitates reduction in the use of conductive material, which often costs more than non-conductive materials. Preferably, the conductive cone 22 is made of conductive plastic (for example, 50% carbon fiber filled nylon, part number #J-1/CF/50/EG from DSM Engineering Plastics, Evansville, Ind.), and the articulating member 20 is made of non-conductive nylon.

In a preferred embodiment of the invention, inactive electrodes 30 (non-selected, non-oscillating) provide enough proximal ground reference to the conductive cone 22, eliminating the need for an electrical connection to the conductive cone 22. In another embodiment, the conductive cone 22, the underside of the flexible member 132, and surface of the anchor posts 37, are made of conductive material (for example, carbon filled polymer thick film conductive paint, part #7101, Dupont Electronics, Research Triangle Park, N.C.), to provide a low impedance (e.g. under 1,000 ohms) to the conductive ground pad 36, increasing the dynamic range, electronic shielding, and noise immunity of the invention.

Preferably, the embodiment of FIGS. 8A and 8B hermetically seals the electrodes 30 from the environment, providing a barrier from moisture (humidity) and other contaminating matter. Referring to FIG. 8B, a top view of the embodiment, the annular rim 35 completely seals the electrodes 30 from the environment.

Dynamic Calibration

Yet another aspect of the present invention is that of an algorithm, used in conjunction with the above-described apparatus, to compensate for component, manufacturing, thermal, humidity, mechanical, and supply voltage variability. The algorithm runs during operation of a system incorporating the invention, and may be implemented in program code, to be executed by the microcontroller 38 or by a system CPU (not shown).

Figure 9:
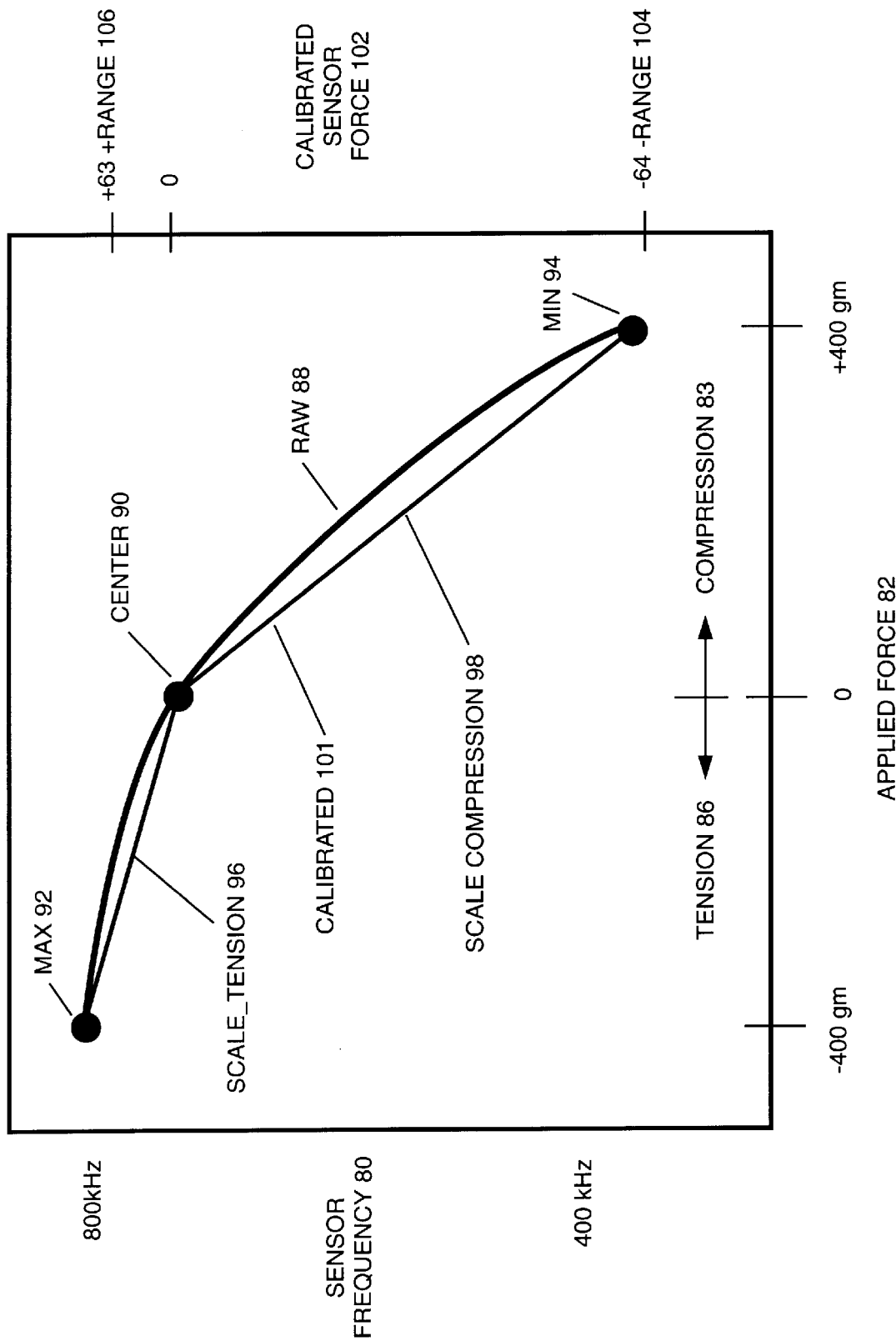
FIG. 9 is a graph showing transfer functions which relate manipulation force input, sensor frequency output, and calibrated sensor output, for calibration of an apparatus according to the invention.

FIG. 9 is a graph, showing sensor frequency 80, such as that produced by the microcontroller 38 of FIG. 4, versus force 82 applied to a device according to the invention by a user's fingertip. The graph pertains to a capacitive link between an articulating member and one of the sensors (see any of the above-discussed embodiments. It will be understood that, for a device employing a plurality of sensors, such as those shown in FIG. 3, there will be a separate such curve for each of the sensors.

The applied force (the abscissa of the graph) has a neutral, central point at which zero force is applied. Deviations from the zero point, in the horizontal direction, reflect either tension 86 or compression 83, caused by opposite-direction forces applied to a given one of the sensors 30.

The frequency 80 of a sensor channel decreases as the conductive cone 22 is forced towards a sensing electrode 30 (COMPRESSION 82). When the conductive cone 22 is pulled away from a sensing electrode 30 (TENSION 86), the capacitance is decreased, and hence the frequency increases. The domain of force values is bounded by MAX and MIN applied force values, shown in this example as being plus and minus 400 grams.

The sensor frequency output is a force-to-frequency curve, which, for the present example, is marked as RAW 88, the "RAW" referring to the fact that the curve has not yet been subjected to the algorithm (discussed below). The curve 88 has three points, CENTER 90, MAX 92, and MIN 94, which define the sensor frequencies for the zero, MAX, and MIN applied force values. The force-to-frequency curve 88 runs between these points. The points, i.e., their coordinates according to the abscissa and ordinate, are stored, as reference values, for each sensor channel.

The shape of the force-to-frequency curve 88 depends on several factors, including the geometry of the articulating member 20 and of the sensing electrodes 30. The curve need not be linear, and it is contemplated that for most implementations of the above-discussed apparatus, it will not be so. For the geometry illustrated in FIGS. 2 and 3, the curve is non-linear.

The calibration algorithm acts to modify, preferably to linearize or piecewise linearize, the force-to-frequency curve 88. The algorithm converts the curve 88, given in terms of the ordinate scale on the left side of the graph, into a calibrated sensor force 102, given in terms of another ordinate scale on the right side of the graph. The range of the calibrated sensor force 102 runs between a minimum 104, labeled –RANGE, and a maximum 106, labeled +RANGE 106. The minimum 104 and the maximum 106 are shown having normalized values –64 and +63, respectively.

The preferred calibration algorithm approximates the non-linear curve RAW 88 as two linear segments, running between the points 90, 92, and 94. These segments have slopes shown as SCALE_TENSION 96 and SCALE_COMPRESSION 98. The slopes are calculated between the maximum 92, the minimum 94, and the center 90 points, as shown.

In a preferred embodiment, the MAX 92 and MIN 94 reference values are dynamically updated every time a sensor channel is read. This typically happens 100 times per second. The CENTER 90 is updated when the articulating member 20 is undisturbed, that is, when no external force is applied.

In one embodiment, an undisturbed state is declared when the changes in the calibrated sensor outputs 102 of all of the sensor channels remain within a minimum movement tolerance for a fixed period of time, for example, when the changes all remain within three calibrated units, according to the sensor output 102 scale, for three seconds.

The following is a pseudo-code representation of the preferred calibration algorithm performed for each sensor channel value:

```
RAW 88 = new sensor reading
if (RAW 88 > MAX 92)
    MAX 92 = RAW 88
else if (RAW 88 < MIN 94)
    MIN 94 = RAW 88
if MAX 92 or MIN 94 has changed, do the following
{       if (RAW 88 > CENTER 90)
            SCALE_TENSION 96 = +RANGE 106/
            (MAX 92-CENTER 90)
        else if (RAW 88 < CENTER 90)
            SCALE_COMPRESSION 98 = –RANGE 104/
            (CENTER 90-MIN 94)
}
if (RAW 88 > CENTER 90)
    CALIBRATED 101 = SCALE_TENSION 96*
    (RAW 88-CENTER 90)
else if (RAW 88 < CENTER 90)
    CALIBRATED 101 = SCALE_COMPRESStON 98*
    (CENTER 90-RAW 88)
```

Once the calibrated sensor output (given in terms of the calibrated sensor force scale 102) are obtained for each sensor channel, the calibrated values are subjected to a force-to-velocity transfer function. A preferred transfer function is described in the IBM Engineering Specification Integrated Pointing Device Engineering Specification: Pointing Stick Type", by T. Selker, J. Rutledge, and B. Olyha, May 17, 1994, pg. 22.

In a preferred embodiment, the calibration reference values (the sloped line segments SCALE_TENSION 96 and SCALE_COMPRESSION 98, and the points MAX 92, MIN 94, and CENTER 90) are measured and calculated dynamically. In another embodiment, the calibration reference values are stored in EEPROM or ROM during manufacture.

An implementation of the dynamic calibration algorithm, transfer function, and additional code to perform serial mouse protocol and infrared wireless modulation occupies less that 2K of ROM and 72 bytes of RAM in the PIC16C58 microcontroller 38.

It is an objective of the invention to operate reliably on battery power. The frequency of the NAND RC oscillators is dependent on supply voltage. The voltage of alkaline batteries decreases as energy is drawn. A preferred embodiment uses a zener diode to stabilize the supply voltage to the NAND circuit. Another embodiment periodically decrements the MAX 92 and MIN 94 value, by a fixed increment, to track the decrease in oscillation frequency.

The non-linearity of the force-to-frequency curve (the curve shown in FIG. 9) of the devices according to the invention, such as that of FIG. 2, can be minimized by reducing the range of deflection of the conductive cone 22, preferably by increasing the stiffness or diameter of the wire 34. A smaller deflection range spans a smaller section of the RAW 88 curve, which is more closely approximated by a linear fit.

In one embodiment, a sensor constructed with a 0.4 inch diameter cone 22, cone angle of 6 degrees, 0.024 inch diameter music wire 32, and an overall length (i.e., height to the top of the cap 26) of 0.5 inches, resulted in a calibrated sensor output 102 which is linear to within 6%. The accuracy of the piece-wise linearization technique can further be enhanced by increasing the number of calibration samples.

Figure 10A:
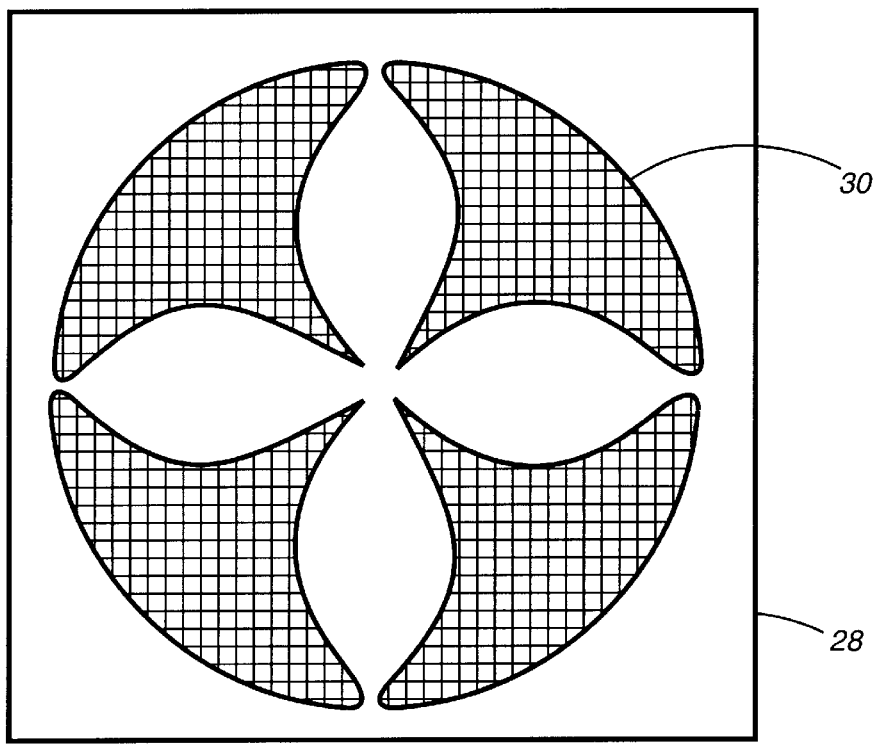
FIGS. 10A and 10B are top views of sensing electrodes, similar to that of FIG. 3, but showing alternative geometries.
Figure 10B:
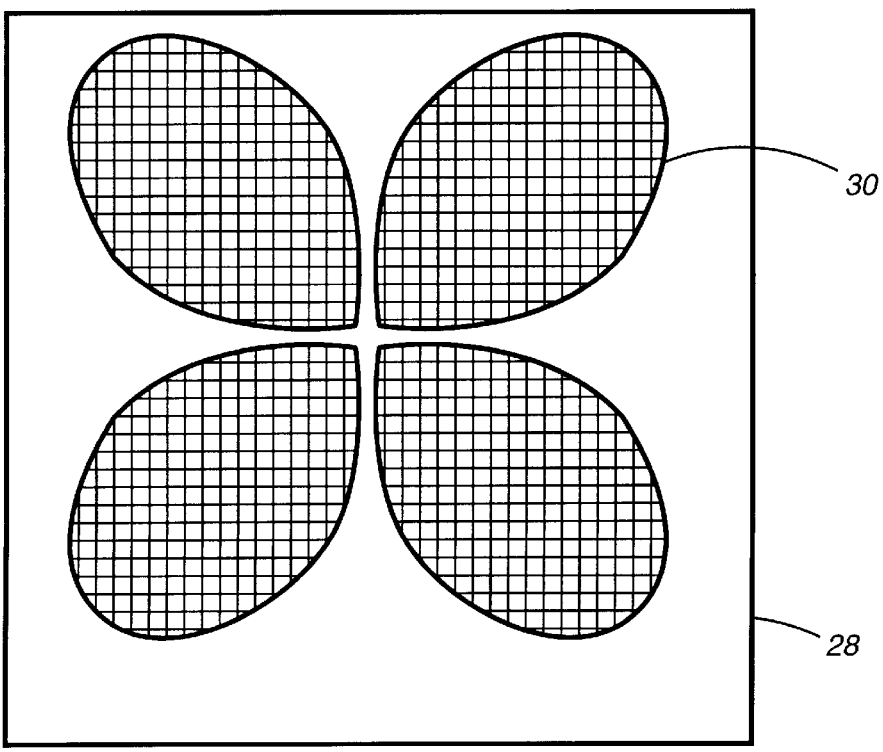

In another embodiment, the shape of the RAW 88 curve is linearized by the particular shape of the sensing electrodes 30. Referring to FIG. 10A, the sensing electrodes 30 are concave-tapered to decrease the slope (sensitivity) of the frequency output 88 around the quiescent (zero force) region. Referring to FIG. 10B, the sensing electrodes 30 are convex-tapered to decrease the slope of the frequency output 88 around the MAX 92 and MIN 94 region. Decreasing the area of the sensing electrodes 30 decreases the dynamic range of the sensor 21. If the dynamic range, for a given configuration of the electrodes 30 is not adequate for a particular application, then the dynamic range can be recovered by increasing the diameter of the cone 22.

The above described embodiments are intended to illustrate the principles of the invention, but not to limit its scope. Other embodiments and variations to these embodiments will be apparent to those skilled in the art, and may be made without departing from the spirit and scope of the invention as defined in the following claims.

What is claimed is:

1. An apparatus for sensing manipulation by a user and for producing signals related to the manipulation in X and Y directions, the apparatus comprising:

an articulating member which articulates responsive to user manipulation thereof, the articulating member including an electrically conductive member;

a planar member;

a plurality of sensing electrodes disposed in parallel to the planar member and about the articulating member to face the electrically conductive member of the articulating member, whereby respective capacitances exist between the electrically conductive member and respective ones of the sensing members, the capacitances having values which vary related to articulation for the articulating member;

detection means for each sensing electrode for detecting respective capacitances and for outputting articulation signals responsive to the detection of the respective capacitances; and calibration means applied to individual articulation signals for providing a unique scaling value for each articulation signal, wherein the scaling value is calculated from a set of reference values at least one reference value for each sensing electrode, that are dynamically updated.

2. An apparatus as recited in claim 2, wherein the articulating member includes:

an anchoring member rigidly coupled to the planar member;

a movable member which is movable responsive to user manipulation thereof; and a coupling member, physically coupled between the anchoring member and the movable member, the coupling member being flexible to allow movement of the movable member relative to the anchoring member.

3. An apparatus as recited in claim 2, wherein:

the anchoring member is annular in shape; and the coupling member is shaped so as to have a quiescent position and a collapsed position, a physical transition between the quiescent position and the collapsed position providing a user with tactile feedback.

4. An apparatus as recited in claim 3, wherein the coupling member is one of (i) dome-shaped and (ii) shaped as an annular arch.

5. An apparatus as recited in claim 1, further comprising a switch having a first position when the articulating member is not being manipulated, and having a second position, entered when the user manipulates the articulating member.

6. An apparatus as recited in claim 5, wherein the articulating member includes a collapsible member having collapsed and non-collapsed positions, the collapsible member entering the collapsed position responsive to user manipulation of the articulating member, and remaining in the non-collapsed position otherwise.

7. An apparatus as recited in claim 1, wherein:

the apparatus further includes an insulating, dielectric layer disposed on the planar member rover the sensing members; and the electrically conductive member of the articulating member includes a resilient layer of electrically conductive material, the layer having a textured surface including projections and voids;

whereby, responsive to manipulation of the articulating member, the projections make contact with the insulating layer to establish a capacitive link with the sensing members; and whereby, responsive to further manipulation of the articulating member, the projections in contact with the insulating layer are deformed so as to increase a quantity of the electrically conductive material of the resilient layer which is in contact with the insulating layer, thereby changing a capacitance value of the capacitive link.

8. The apparatus of claim 1, wherein the sensing electrodes each comprise shapes so as to produce desired transfer functions between articulation of the articulating member and the values of the articulation signals.

9. The apparatus of claim 8, wherein the sensing electrodes each comprise a taper of increasing area.

10. The apparatus of claim 8, wherein the sensing electrodes each comprise a taper of decreasing area.

11. The apparatus of claim 1, wherein the apparatus further senses manipulation in the Z direction and individual articulation signals are summed to produce a signal representing the Z direction component of force applied to said articulating member.

12. The apparatus of claim 1, further comprising means applied to individual articulation signals for providing a quiescent value for each articulation signal indicating the user has ceased manipulation of the articulating member.

13. The apparatus of claim 1, further comprising switch means for receiving a force applied to the articulating member and an output for providing a switch activation signal.

14. The apparatus of claim 13, further comprising:
wake-up means for receiving switch activation signal and for providing a wake-up signal; and
a microprocessor with at least a normal power mode and low power mode, whereby when said microprocessor is in low power mode, said wake-up signal causes said microprocessor to leave the low power mode and enter into the normal power mode.

15. The apparatus of claim 13, wherein said switch means comprise a mechanical switch.

16. The apparatus of claim 13, wherein said switch means further comprise an electrical contact disposed on the planar, whereby contact between the electrically conductive member of the articulating member and said electrical contact occurs when a force is applied to the articulating member.

17. The apparatus of claim 1, wherein said detector means includes an oscillator circuit, whereby the frequency of the oscillator is dependent on the value of the respective capacitance, further comprising selection means to sequentially enable each oscillator in a temporal sequence.

18. The apparatus of claim 1, further comprising switch means for receiving a force applied to the articulating member and an output for providing a switch activation signal.

19. The apparatus of claim 18, further comprising:
wake-up means to receive switch activation signal and output a wake-up signal; and
a microprocessor comprising at least a normal power mode and a low power mode, whereby when said microprocessor is in the low power mode, said wake-up signal causes said microprocessor to leave the low power mode and enter into the normal power mode.

20. The apparatus of claim 18, wherein said switch means comprise a mechanical switch.

21. The apparatus of claim 18, wherein said switch means comprise an electrical contact disposed on the planar, whereby contact between the electrically conductive member of the articulating member and said electrical contact occurs when a force is applied to the articulating member.

22. An apparatus for sensing manipulation by a user and for producing signals related to the manipulation in X and Y directions, the apparatus comprising:
an articulating member which articulates responsive to user manipulation thereof, the articulating member including an electrically conductive member;
a plurality of sensing electrodes disposed about the articulating member to face the electrically conductive member, whereby respective capacitances exist between the electrically conductive member and respective ones of the sensing electrodes, the capacitances having values which vary related to articulation for the articulating member;
calibration means applied to individual articulation signals to provides a unique scaling value for each articulation signal, wherein said scaling value is calculated from a set of reference values, at least one reference value for each sensing electrode, that are dynamically updated; and
an oscillator circuit for each sensing electrode, wherein the frequency of the oscillator is dependent on the value of the respective capacitance, selection means to sequentially enable each oscillator in a temporal sequence.

23. The apparatus of claim 22, wherein the sensing electrodes each comprise shapes so as to produce desired transfer functions between articulation of the articulating member and the values of the articulation signals.

24. The apparatus of claim 23, wherein the sensing electrodes each comprise a taper of increasing area.

25. The apparatus of claim 23, wherein the sensing electrodes each comprise a taper of decreasing area.

26. The apparatus of claim 23, further comprising calibration means applied to individual articulation signals for providing a quiescent value for each articulation signal indicating the user has ceased manipulation of the articulating member.

27. The apparatus of claim 22, wherein the scaling value is calculated from a set of reference values, at least one reference value for each sensing electrode, that are dynamically updated.

28. The apparatus of claim 22, further comprising switch means to receive force applied to the articulating member and output a switch activation signal.

29. The apparatus of claim 28, further comprising:
a wake-up means for receiving a switch activation signal and for providing a wake-up signal; and
a microprocessor with at least a normal power mode and low power mode, whereby when said microprocessor is in low power mode, said wake-up signal causes said microprocessor to leave the low power mode and go into normal power mode.

30. The apparatus of claim 28, wherein said switch means comprise a mechanical switch.

31. The apparatus of claim 28, wherein said switch means further comprise an electrical contact disposed on the planar, whereby contact between the electrically conductive member of the articulating member and said electrical contact occurs when a force is applied to the articulating member.

32. The apparatus of claim 22, wherein the sensing each electrodes comprise shapes so as to produce desired transfer functions between articulation of the articulating member and the values of the articulation signals.

33. The apparatus of claim 32, wherein the sensing electrodes each comprise a taper of increasing area.

34. The apparatus of claim 30, wherein the sensing electrodes each comprise a taper of decreasing area.

35. The apparatus of claim 22, wherein the apparatus further senses manipulation in the Z direction and individual articulation signals are summed to produce a signal representing the Z component of force applied to said articulating member.

36. The apparatus of claim 22, further including calibration means applied to individual articulation signals for providing a quiescent value for each articulation signal indicating the user has ceased manipulation of the articulating member.

* * * * *

UNITED STATES PATENT AND TRADEMARK OFFICE
CERTIFICATE OF CORRECTION

PATENT NO.    : 6,184,865 B1
DATED         : February 6, 2001
INVENTOR(S)   : Thomas G. Zimmerman, et al.

It is certified that error appears in the above-identified patent and that said Letters Patent is hereby corrected as shown below:

Please make the following changes:

Column 14,
Line 4, from "values at" to -- values, at --
Line 7, from "claim 2," to -- claim 1, --
Line 38, from "rover" to -- over --

Column 15,
Line 29, from "claim 1," to -- claim 7, --
Line 62, from "provides" to -- provide --

Column 16,
Line 40, from "the planar," to -- a planar member, --
Line 44, from "claim 22," to -- claim 28, --
Line 44-45, from "sensing each electrodes" to -- sensing electrodes each --
Line 50, from "claim 30," to --claim 32, --

Signed and Sealed this

Sixth Day of November, 2001

Attest:

NICHOLAS P. GODICI
Attesting Officer    Acting Director of the United States Patent and Trademark Office